United States Patent
Hofer et al.

[15] 3,670,424
[45] June 20, 1972

[54] RECOVERY OF ADSORBATE FROM ACTIVATED CARBON

[72] Inventors: Lawrence John Edward Hofer, Pittsburgh, Pa.; Milton Manes, Kent, Ohio

[73] Assignee: Calgon Corporation, Pittsburgh, Pa.

[22] Filed: March 15, 1971

[21] Appl. No.: 124,535

[52] U.S. Cl. ...........................................................34/009
[51] Int. Cl. ....................................................F26b 5/00
[58] Field of Search.......................................................34/9

[56] References Cited

UNITED STATES PATENTS 3,559,296 2/1971 Dratwa et al. ............................34/009
3,589,023 6/1971 Figiel......................................34/009

*Primary Examiner*—John J. Camby
*Attorney*—William L. Krayer and Herbert J. Zeh, Jr.

[57] ABSTRACT

The removal of an adsorbate from activated carbon in order to use or further process the adsorbate is accomplished by (1) the use of a displacing medium having a refractive index of at least 1.5 and which is greater than the refractive index of the adsorbate, or (2) the use of a displacing medium having a refractive index greater than or of at least 1.5 together with or followed by a solvent for the adsorbate. The adsorbate is recovered in the form of a solution in the solvent.

10 Claims, No Drawings

RECOVERY OF ADSORBATE FROM ACTIVATED CARBON

BACKGROUND OF THE INVENTION

Prior to the present invention, activated carbon has been used mainly to remove contaminants or impurities from liquids and gases. When the capacity of the carbon is filled, it is either discarded or regenerated. In either case, no attempt is usually made to recover the material adsorbed on the carbon.

However, activated carbon has been used to separate and/or recover a few compositions in processes where it is desirable to remove the adsorbate from the carbon and process it further, at the same time preparing the carbon for re-use. Such processes for recovery from activated carbon usually have involved the use of solvents to remove the adsorbate, and, generally, are expensive and not particularly efficient. They have been applied mainly to valuable or expensive adsorbates in unique circumstances where other recovery methods are subject to even worse difficulties and where degradation products are highly undesirable. For example, see A. L. Baron, "Handbook of Antibiotics," Reinhold Publishing Corporation, N. Y., 1950, P. 225.

Polanyi [ see Verh, Deut. Physik. Ges. 16, 1012 (1914); 18, 55 (1916); Z. Elektrochem. 26,370 (1920); and Z. Physik 2, 111 (1920)] proposed an adsorption theory when knowledge of the mechanisms of adsorption were very primitive and a minimum of experimental or theoretical information was available which was highly empirical and related simply to the thermodynamic concept of potential. It may be summarized as follows: Within the range of the attractive forces of the solid surface (the "adsorption space") the potential energy of a given gas is reduced, relative to its value at infinity, by an amount $e$ (the adsorption potential) that for a given gas depends on proximity to the solid surface. One can imagine points of equal $e$ values to be joined to form equipotential surfaces that together with the solid surface enclose a volume $V(e)$. The plot of $V(e)$ against $e$ (the "characteristic curve") depends on the structure of the adsorbent, and no attempt is made to derive it from theory; it is independent of temperature. When the adsorbent, initially at low pressure, is exposed to increasing pressures of gas, the attractive forces of the solid for the gas molecules reinforce their attraction for each other, with the result that the gas liquefies between the solid surface and that equipotential surface for which $$e(V) = RT \ln p_s/p \qquad (1)$$

where $e$ is the (equilibrium) pressure of the gas and $p_s$ the vapor pressure of the corresponding liquid at the equilibrium temperature. Given an adsorption isotherm over some capacity range one can calculate the characteristic curve over the same capacity range by use of Equation (1) and an estimate of the density of the presumed liquid adsorbate. Having determined the characteristic curves, one can now calculate adsoption isotherms at other temperatures.

If the adsorptive forces for different gases are of the same nature, then one may expect that the characteristic curves for different gases on a single adsorbate should all be the same except for a constant factor multiplying the adsorption potential. Dubinin [ see M. M. Dubinin, Chem. Revs. 60,235 (1960)] expressed this in the equation $$V = f(e/\beta) \qquad (2)$$

where $\beta$ is his "affinity coefficient." Dubinin and Timofeev [ M. M. Dubinin and D. P. Timofeev, Compt. rend. Acad. Sci. URSS 54, 701 (1946)] have compared the experimental affinity coefficients of a set of gases with the corresponding molar volumes ($\overline{V}$) and with several different estimates of the molar polarizabilities, and have concluded that the affinity ratios of different pairs of gases are best approximated by the ratio of their molar volumes. Lewis, Gilliland, Chertow, and Cadogan [ W. K. Lewis, E. R. Gilliland, B. Chertow, W. P. Cadogan, Ind. Eng. Chem. 42, 1319 (1950)] and Grant, Manes, and Smith [ R. J. Grant, M. Manes, and S. B. Smith, A.I.Ch.E.J. 8, 403 (1962)] found that within the homologous series of saturated hydrocarbons on activated carbon, the plots of volume adsorbed versus $(e/\overline{V})$ collapsed to a single curve (the "generalized correlation curve") with considerable accuracy. However, Dubinin and Timofeev found the discrepancy between molar volume ratios and affinity coefficient ratios could be as much as 20 percent (some of which could have been due to specific chemical effects). Similarly, Grant, Manes, and Smith found that at equal adsorbate volumes, $e/\overline{V}$ was some 10 percent higher for carbon disulfide than for the hydrocarbon series.

Polanyi originally supposed that adsorption of solid solutes from solution would be analogous to the adsorption of gases, with precipitation of solid taking the place of liquefaction of gas, and with the adsorption potential now estimated as $$e_s(V) = RT \ln c_s/c \qquad (3)$$

where $c_s$ and $c$ are the saturated and the equilibrium concentrations and $e_s$ is the adsorption potential of the pure solute adsorbing as a vapor. However, he later recognized that the adsorption of a solid solute would have to be accompanied by the desorption of an equal volume of solvent. As a result, Equation (1) would have to be modified to read (with a slight change in notation)

$$RT \ln \frac{c_s}{c} = \text{``}e\text{''}_{s_l} = \text{``}e\text{''}_s - \text{``}e\text{''}_l \frac{V_s}{V_l} \qquad (4)$$

where $e$ is the adsorption potential of the solvent and $V_s$ and $V_l$ the molar volumes of (solid) solute and solvent.

Polanyi concluded from Equation (4) that adsorption of a solute would be weakest from solvents with the highest values of $V_s e_l/V_l$ (or $(e_l/V)$ for constant $\overline{V}_s$). He then drew attention to an observation of Freundlich to the effect that adsorption tends to be weakest in those solvents that are themselves most strongly adsorbed from solution. He noted further that since the various solvents would differ only slightly in their values of $(\overline{V}_s/V_l) e_l$, one would expect that the equilibrium concentrations at equal capacities for various solvents would differ largely because of differences in solubilities, as had been found by Davis [ Trans. Chem. Soc. 91, 1666 (1907)]in studies on the adsorption of iodine on carbon.

Equation (4) may be written more symmetrically and succinctly as $$(e/V_s) = (e_s/V_s) - (e_l/V_l)$$

provided that the potential is always regarded as pertaining to a given volume of loading.

Polanyi suggested that $$e = kP \qquad (5)$$

where $k$ is a constant.

Recently Manes and Hofer [ J.P. Chem. 73, 584 (1969)] suggested that the relative polarizabilities of different solvents could be estimated from the index of refraction using the Lorentz-Lorenz equation. (See Equation 6) Appropriate indices of refraction for solid crystalline solutes can be estimated from tables of atomic refractivities as found in Lange's "Handbook of Chemistry," 10th Edition. The worst anomalies are found with molecules which may be expected to have steric blockage against close approach to the carbon surface.

Using the Lorentz-Lorenz equation for polarizability per unit volume $$\frac{P}{V} = \frac{4\pi}{3}\left(\frac{n^2-1}{n^2+2}\right) \qquad (6)$$

[ Chem. Eng. Progress, V. 65, P. 84 – 8 (1969)], Hofer and Manes developed the following general equation which contains only experimentally verifiable quantities $$\frac{\text{``}e\text{''}}{V_s} = k\left[\left(\frac{n^2-1}{n^2+2}\right)_s - \left(\frac{n^2-1}{n^2+2}\right)_l\right] \qquad (7)$$

where the subscripts $s$ and $l$ refer to the adsorbate (solute) and solvent (liquid), respectively.

It will be observed that Equation (7) contains a factor which is a difference between two quantities, i.e., $[(n^2-1)/(n^2+2)]_s$ and $[(n^2-1)/(n^2+2)]_l$. This means that as the terms, $[(n^2-1)/(n^2+2)]_s$ and $[(n^2-1)/(n^2+2)]_l$ approach each other in value, the precision of the difference decreases. It is thus important to know both quantities more and more accurately as the index of refraction of the solvent approaches that of the solute. In any case, Equation (7) simply is meaningless when $n_s \to n_1$ or when $n_s > n_1$.

To the extent that Equation (7) holds, it permits the calculation of the equilibrium concentration in any solvent provided only that the polarizabilities (or the index of refraction), the molar volume of the solute, and the solubility are known. The last is readily determined by experimental techniques. Possibly the simplest technique is simply to allow the solute to equilibrate with the solvent and to analyze the supernatant liquid by techniques such as spectrometry, chromatography, or even gravimetrically after evaporation of the solvent.

The concept of a displacer being used to remove materials from adsorbents is not a new one. See, for example, Robertson et al. U.S. Pat. No. 3,476,822 which employs materials of the formula

wherein $R_1$, $R_2$ and $R_3$ are selected from hydrogen and alkyl radicals of one to five carbons.

SUMMARY OF THE INVENTION

Our invention contemplates the use of displacing agents having an index of refraction greater than 1.5 to remove any adsorbate having a lower index of refraction than the displacer. Removal of the adsorbate may, under circumstances explained further herein, be aided by a solvent introduced with the displacer to dissolve the displaced adsorbate. The volume of the displacer should be at least equal to the unoccupied micropore volume of the carbon.

The theoretical extraction from an activated carbon on which an adsorbate has been laid can be calculated by taking the value "$C$", the concentration in equilibrium with the carbon-adsorbate complex, and multiplying it by the volume of the extracting solvent and the number of times the extraction has been carried out.

To calculate the course and the behavior of a system by extraction at equilibrium it is necessary to determine the value of $e$ for the solution. Since the molar volume of the solute is known and presumably the index of refraction of the solvent and the solute, $e$ can readily be calculated from Equation (7). If the solubility of the solute in the particular solvent is known, the amount of solute in equilibrium with the carbon at any given loading can now be calculated. If the amount of solvent coming in contact with the carbon-adsorbate complex is known, then the percentage $t$ of extracted material in a single pass can be calculated by a simple algebraic method as follows:

$$t = \frac{CV}{(x/m) \cdot m} \times 100 \qquad (8)$$

where $C$ is the concentration of the adsorbate in equilibrium at a loading of $x/m$, $V$ is the volume of the extracting medium and $m$ is the mass of the carbon used.

Persons skilled in the art will observe from the above that extracting media having the highest index of refraction are the most desirable. Among the relatively available chemicals having high indices of refraction at 25°C. are 1,2-diethylbenzene, pentachloroethane, 1-iodopropane, 1,2-dimethylbenzene, ethyl benzoate, β-picoline, tetrachloroethylene, phenetole, pyridine, iodoethane, phenylmethallyl ether, anisole, methyl benzoate, diallylphthalate, benzylacetate, 2-methyl-4-tertiarybutylphenetol, phenylacetonitrile, methyl salicylate, chlorobenzene, fufural, benzonitrile, thiophene, nonachlorodiethyl ether, iodomethane, 4-phenyldioxane, 3-phenylpropan-1-ol, acetophenone, benzyl alcohol, 1,2-dibromoethane, 1,2,3,4-tetrahydronaphthalene, m-cresol, 1,3-dichlorobenzene, benzaldehyde, styrene, nitrobenzene, o-dichlorobenzene, bromobenzene, o-nitroanisole, m-toluidine, benzyl benzoate, o-toluidine, 1-methoxyphenyl-1-phenyl-ethane, aniline, o-chloroaniline, bromoform, benzenethiol, 2,4-bis (β-phenylethyl)-phenylmethyl ether, carbondisulfide, diiodomethane. Some such materials are hazardous or otherwise undesirable for practical application; nevertheless they are operable in our invention. Our most preferred displacer is carbon disulfide. Our displacers work particularly well on petroleum fractions as adsorbates.

When, for various reasons, a suitable solvent cannot be found which combines the properties desired of high index of refraction and high solubility for the adsorbate together with acceptability from the standpoint of toxicity and physical properties, the practical problem becomes more complex. A mixture of two agents has been found to perform very well. Thus, for example, a combined solution could be used in which one component has a high solubility for the adsorbate and another component has a high index of refraction. By combining the two compounds we have a mixture which exhibits both the necessary index of refraction (and displacing power) and permits a reasonable solubility of the adsorbate.

In a variation of our invention we have found that the use of a solvent for the adsorbate along with or following the displacer greatly enhances the efficiency of recovery. The quantity of adsorbate recoverable by a given amount of displacer is influenced by the ratio of displacer to adsorbate, as will be explained. Whether the solvent is used together with or following the displacer, the solvent should be sufficient in amount to dissolve the displaced adsorbate. As a general rule of thumb, we prefer to use at least enough solvent to dissolve the entire amount of adsorbate on the carbon.

The displacer having a relatively high index of refraction may be used together with a solvent for the adsorbate which assists in removing the adsorbate from the area of significant adsorption potential. For example, thiophene, which has a refractive index of 1.5256, may be used together with ethanol, methanol, or other materials which are solvents for adsorbates not readily dissolved by thiophene. The material used as a solvent in such a combination need not have a refractive index greater than 1.5. In fact, it need not be a solvent for the displacer but, if it is, of course it will enable one to use of displacer which may be otherwise impractical because it is normally a solid at the temperature used, or because it is otherwise difficult to handle by itself. Mixtures of solvent and displacer which are not miscible can be used.

The effectiveness of thiophene as a displacer, with and without a solvent, is illustrated in Table 1 with several different adsorbates. For this demonstration, 25 gram samples of activated carbon were impregnated with 2.5 grams of adsorbate. Three cycles of extraction were then made in a Soxhlet extractor using 100 cubic centimeters of displacer/solvent mixture. Results were as follows:

TABLE 1

Extraction with Thiophene and Solvent

| Adsorbate | Displacer (cc) | Adsorbate Solvent (cc) | Percent of Extracted |
|---|---|---|---|
| p-Chlorophenol | Thiophene | Methanol | |
| | 0 | 100 | 2.03 |
| | 10 | 90 | 15.4 |
| | 100 | 0 | 7.5 |
| p-Nitrophenol | Thiophene | Methanol | |
| | 0 | 100 | 5.18 |
| | 10 | 90 | 22.5 |
| | 100 | 0 | 14.0 |
| Sucrose | Thiophene | Methanol | |
| | 0 | 100 | 14.5 |
| | 10 | 90 | 27.3 |
| | 100 | 0 | 4.4 |
| Ascorbic Acid | Thiophene | Methanol | |
| | 0 | 100 | 13.9 |

| Ascorbic Acid | | | |
|---|---|---|---|
| | 10 | 90 | 14.7 |
| | 100 | 0 | 6.0 |
| | Thiophene | Ethanol | |
| | 0 | 100 | 18.3 |
| | 10 | 90 | 19.3 |
| | 100 | 0 | 7.5 |

Persons skilled in the art will recognize that the thiophene/methanol mixtures show the most improvement over the use of either alone in the removal of those adsorbates which are most tenaciously held by the carbon.

Thus, it will be seen that our invention in a preferred mode contemplates the use of a mixture of (a) a displacing agent having an index of refraction at 25° C. of at least 1.5, in an amount within 50 percent more or less of the difference between the micropore volume of the carbon and the volume of the adsorbate and (b) enough solvent for the adsorbate to dissolve the displaced adsorbate, the displacing agent being characterized by a refractive index of at least 1.5. We may use a mixture including up to about 98 percent solvent. Workers in the art will observe that the amount of displacer used will have a relation to the amount of micropore volume of the carbon and that the larger part of the solvent will occupy the voids between the activated carbon particles or granules.

In experiments designed to show the optimum amounts of displacer with respect to the amount of adsorbate on the carbon, amaranth red was placed on the carbon in amounts of 2 percent, 10 percent and 20 percent of the weight of the carbon. Persons familiar with the art may recognize that 20 percent represents near the loading capacity of the carbon (Pittsburgh-type CAL) for amaranth red. The impregnation was made with water into 25 grams samples of the carbon. The samples were air-dried after 24 hours exposure to the solutions.

In each case the extraction was carried out with 100 cubic centimeters of solvent/displacer mixture, as indicted, in a Soxhlet extractor. Ten cycles of extraction were used in each case. The results shown in Table 2 are with mixtures of methanol as the solvent and thiophene as the displacer.

TABLE 2

Percent of Amaranth Red Extracted from CAL

Carbon with Methanol-Thiophene

| Volume of displace (thiophene) cm³/g of carbon | Volume of amaranth plus thiophene cm³/g of carbon load | Efficiency of extraction percent | Loading of amaranth by weight percent |
|---|---|---|---|
| 0.00 | 0.02 | 0.0 | 2 |
| 0.08 | 0.10 | 1.2 | 2 |
| 0.20 | 0.22 | 4.2 | 2 |
| 0.40 | 0.42 | 8.0 | 2 |
| 0.80 | 0.82 | 10.4 | 2 |
| 1.40 | 1.42 | 9.0 | 2 |
| 2.00 | 2.02 | 4.5 | 2 |
| 0.00 | 0.10 | 2.4 | 10 |
| 0.08 | 0.18 | 6.3 | 10 |
| 0.20 | 0.30 | 6.5 | 10 |
| 0.40 | 0.50 | 8.9 | 10 |
| 0.80 | 0.90 | 6.1 | 10 |
| 1.40 | 1.50 | 4.4 | 10 |
| 2.00 | 2.10 | 1.6 | 10 |
| 0.00 | 0.20 | 4.0 | 20 |
| 0.08 | 0.28 | 8.7 | 20 |
| 0.20 | 0.40 | 8.9 | 20 |
| 0.40 | 0.60 | 5.8 | 20 |
| 0.80 | 1.00 | 3.0 | 20 |
| 1.40 | 1.60 | 2.3 | 20 |
| 2.00 | 2.20 | 1.6 | 20 |

The extraction results above are expressed in terms of the percent of the adsorbate extracted.

It will be observed that the optimum amount of displacer changes inversely with an increased loading of adsorbate. An explanation of these results is that the adsorption space must be completely filled with either adsorbate (amaranth red in this case) or displacer (thiophene in this case) or both if extraction is to be optimum. The total volume of displacer and adsorbate is close to the micropore volume of the carbon used (about 0.55 to 0.65 cubic centimeters).

Our invention may be used to recover various adsorbates from activated carbon, in addition to petroleum fractions, such as phenols, dyes, antibiotics, chelating agents, metal chelates, mercury compounds, and so forth. It may also be used as a method of reactivating activated carbon by removing the solvent and evacuating the displacer by known methods after it has displaced in the adsorbate.

We do not wish or intend to be bound by any theories suggested in the above description of our invention. It may be otherwise variously practiced within the scope of the following claims.

We claim:

1. Method of extracting an adsorbate from activated carbon comprising passing into the activated carbon containing the adsorbate a displacing medium having a refractive index of at least 1.5, and which is at least equal to the refractive index of the adsorbate, and recovering the adsorbate thereby displaced.

2. Method of claim 1 in which the volume of displacing medium passed into the activated carbon is within 50 percent more or less of the difference between the micropore volume of the activated carbon and the volume of the desired adsorbate.

3. Method of claim 2 followed by the step of introducing a solvent for the adsorbate, in an amount sufficient to at least dissolve the displaced adsorbate.

4. Method of claim 1 in which the displacing medium is carbon disulfide.

5. Method of claim 1 in which the adsorbate is a petroleum fraction.

6. Method of displacing an adsorbate from activated carbon comprising introducing into the activated carbon a mixture of (a) a displacing agent having an index of refraction at 25° C. of at least 1.5, in an amount within 50 percent more or less of the difference between the micropore volume of the carbon and the volume of the desired adsorbate, and (b) enough solvent to dissolve the displaced adsorbate.

7. Method of claim 6 in which the adsorbate is a petroleum fraction.

8. Method of claim 6 in which the displacing agent is carbon disulfide.

9. Method of claim 1 followed by evacuating the displacing medium to reactivate the activated carbon.

10. Method of claim 6 followed by reactivation by removing the solvent and evacuating the displacer from the carbon.

* * * * *